US007891268B2

(12) United States Patent  (10) Patent No.: US 7,891,268 B2
Park  (45) Date of Patent: Feb. 22, 2011

(54) TELESCOPING-TILTING DEVICE OF STEERING COLUMN FOR VEHICLE

(75) Inventor: Joo-yeol Park, Wonju (KR)

(73) Assignee: Mando Corporation, Gyeonggi-do (KR)

( * ) Notice: Subject to any disclaimer, the term of this patent is extended or adjusted under 35 U.S.C. 154(b) by 288 days.

(21) Appl. No.: 12/290,211

(22) Filed: Oct. 28, 2008

(65) Prior Publication Data

US 2009/0120230 A1 May 14, 2009

(30) Foreign Application Priority Data

Nov. 12, 2007 (KR) ............................ 2007-0114687

(51) Int. Cl.
B62D 1/18 (2006.01)
(52) U.S. Cl. ......................................... 74/493; 280/777
(58) Field of Classification Search .................... 74/493, 74/492; 280/777, 775
See application file for complete search history.

(56) References Cited

U.S. PATENT DOCUMENTS 5,595,399 A * 1/1997 Fouquet et al. .............. 280/777
5,944,348 A * 8/1999 Boyle et al. .................. 280/777
7,387,045 B2 * 6/2008 Klukowski et al. ............ 74/493
2009/0013818 A1 * 1/2009 Arbanas et al. ............... 74/493
2009/0108576 A1 * 4/2009 Fong ........................... 280/777

* cited by examiner

Primary Examiner—Richard W Ridley
Assistant Examiner—Terence Boes
(74) Attorney, Agent, or Firm—McDermott Will & Emery LLP

(57) ABSTRACT

Disclosed is a telescoping-tilting device of a steering column for a vehicle, the telescoping-tilting device including a distance member which has an elongated hole formed at each side of the distance member in parallel to a steering shaft and a guide groove formed on each inner surface of the both sides of the distance member in parallel to each elongated hole, and a supporting block positioned within the distance member, the supporting block having a through hole shaped to be engaged with a bolt and a wing which can be inserted into each guide groove and extends out from both sides of the supporting block in each side direction. When impact is applied, the distance member does not move respective to the mounting bracket. Therefore, there is an advantage in that collision energy is generated as planned and a desired impact absorption mechanism can be achieved.

2 Claims, 4 Drawing Sheets

TELESCOPING-TILTING DEVICE OF STEERING COLUMN FOR VEHICLE

TECHNICAL FIELD

The present disclosure relates to a telescoping-tilting device of a steering column for a vehicle, and particularly to a telescoping-tilting device of a steering column for a vehicle, which has an improved supporting structure so that movement of a distance member is suppressed in the telescoping-tilting device of the steering column when a collision occurs in the vehicle so as to achieve a desire impact absorption mechanism.

BACKGROUND ART

A steering column is a device having a structure surrounding a steering shaft, which transfers rotational force generated according to the operation of a steering wheel performed by a driver to wheels of a vehicle, so as to support rotation of the steering shaft, and is assembled with a chassis of a vehicle through a mounting bracket so that the steering column fixes a position of a steering shaft.

The steering column includes a telescopic device and a tilt device, which can adjust the degree of protrusion and slant of the steering wheel to be suitable for the body shape of a driver.

FIG. 1a is a partially exposed perspective view of a conventional telescoping-tilting device of a steering column for a vehicle, and FIG. 1b is a sectional view of the telescoping-tilting device, which is assembled with a lever.

As shown in FIGS. 1a and 1b, the conventional telescoping-tilting device 100 of a steering column for a vehicle includes: a mounting bracket 107 for fixing a steering column to a chassis of a vehicle, the steering column including an inner tube 103 and an outer tube 105, which surround a steering shaft 101 in such a manner that they can slide respective to each other; a distance member 106 positioned within the mounting bracket 107 in such a manner that the distance member 106 is attached onto a part of an outer circumferential surface of the outer tube 105; and a lever 113 assembled with one side of the mounting bracket 107 through a bolt 109 and a cam 111.

The steering shaft 101 has an upper end connected with the steering wheel 102 and transfers rotational force generated according to the operation of the steering wheel 102 performed by the driver to wheels (not shown) of the vehicle, the wheels being positioned at a lower end of the steering shaft 101.

The inner tube 103 has a cylindrical shape having a uniform diameter and surrounds a lower part of the steering shaft 101. A lower bracket (not shown) is positioned on an outer circumferential surface of a lower part of the inner tube 103. Therefore, it is possible to fix a position of the inner tube 103 by fixing the lower bracket to the chassis of the vehicle.

The outer tube 105 has an inner diameter larger than an outer diameter of the inner tube 103 so that the outer tube 105 slides along the outer circumferential surface of the inner tube 103. That is, a telescoping operation can be performed. Meanwhile, the outer tube 105 surrounds an upper part of the steering shaft 101.

A distance member 106 is attached onto a part of the outer circumferential surface of the outer tube 105 by welding, etc. Each elongated hole (not shown) for adjusting the telescoping operation is formed at both sides of the distance member 106 in a direction parallel to the steering shaft. Also, a supporting member 119 for increasing strength can be installed at inner surfaces of both sides of the distance member 106.

The mounting bracket 107 is formed in such a manner that it surrounds the outer tube 105. The upper side of the mounting bracket is fixed in the chassis of the vehicle, and a supporting part 108, which is assembled with each outer surface of the both sides of the distance member 106, extends from the lower side of the mounting bracket. Also, an elongated hole 115 for adjusting a tilting operation is formed at the supporting part 108 in a direction perpendicular to the steering shaft so that a tilting operation of the steering column can be performed.

The lever 113 is assembled with a bolt 109 extending though the elongated hole 115 of the mounting bracket 107 and the elongated hole of the distance member 106, and the bolt 109 is assembled with a nut 118. As the lever 113 rotates around an axis of the bolt 109, a cam 111 disposed between the lever 113 and the supporting part 108 is driven so that each surface of the supporting part 108 of the mounting bracket 107 and each surface of the distance member 106, which face each other, make close contact with each other or are spaced from each other so as to set a locked state of the telescoping-tilting device 100 or a released state thereof.

However, in the conventional telescoping-tilting device 100 of a steering column for a vehicle, the mounting bracket 107 and the distance member 106 are fixed with each other while making close contact with each other by tightening force generated through the bolt 109, the nut 118 and the cam 111. Therefore, when external impact is transferred to the steering column because of collision of a vehicle, etc., the distance member 106 easily moves in an axial direction of the steering shaft within the mounting bracket 107. As a result, there is a problem in that a desired impact absorption mechanism cannot be achieved.

DISCLOSURE OF INVENTION

Therefore, it is an object of the present disclosure to provide a telescoping-tilting device of a steering column for a vehicle, which has an improved supporting structure so that movement of a distance member is suppressed in the telescoping-tilting device of the steering column when a collision occurs in the vehicle so as to achieve a desired impact absorption mechanism.

According to an embodiment of the present invention, there is provided a telescoping-tilting device of a steering column for a vehicle, including: a mounting bracket for fixing a steering column including an inner tube and an outer tube surrounding a steering shaft in such a manner that the inner and outer tubes can slide respective to each other; a distance member positioned within the mounting bracket in such a manner that the distance member is attached onto a part of an outer circumferential surface of the outer tube, the distance member having each elongated hole formed at both sides of the distance member in parallel to the steering shaft and each guide groove formed on inner surfaces of both sides of the distance member in parallel to each elongated hole; a lever assembled with one side of the mounting bracket through a bolt and a cam; and a supporting block positioned within the distance member, the supporting block having a through hole shaped to be engaged with the bolt and a wing which can be inserted into each guide groove and extends out from both sides of the supporting block in each side direction.

BEST MODE FOR INVENTION

Hereinafter, an exemplary embodiment of the present invention will be described with reference to the accompanying drawings.

Figure 2:
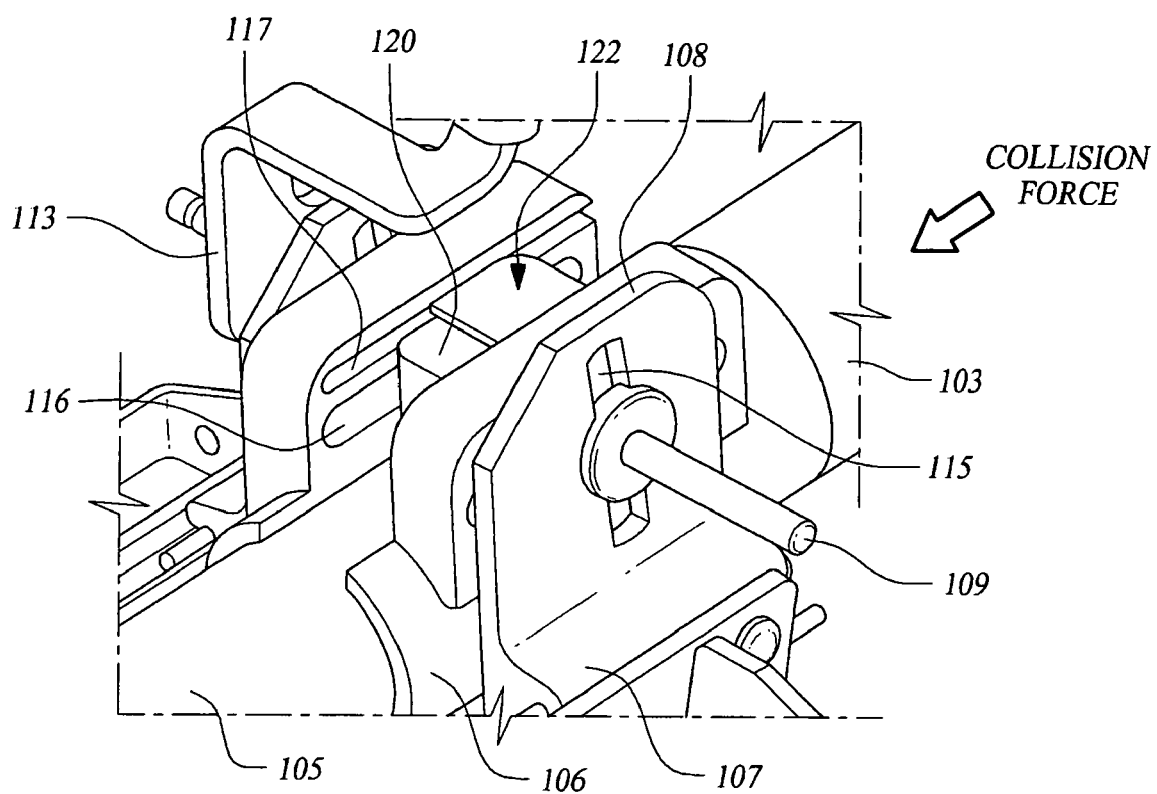
FIG. 2 is a perspective view of a telescoping-tilting device of a steering column for a vehicle according to an embodiment of the present invention, in which the telescoping-tilting device is shown upside down.

FIG. 2 is a perspective view of a telescoping-tilting device of a steering column for a vehicle, according to an embodiment of the present invention, in which the telescoping-tilting device is shown upside down.

Figure 1A:
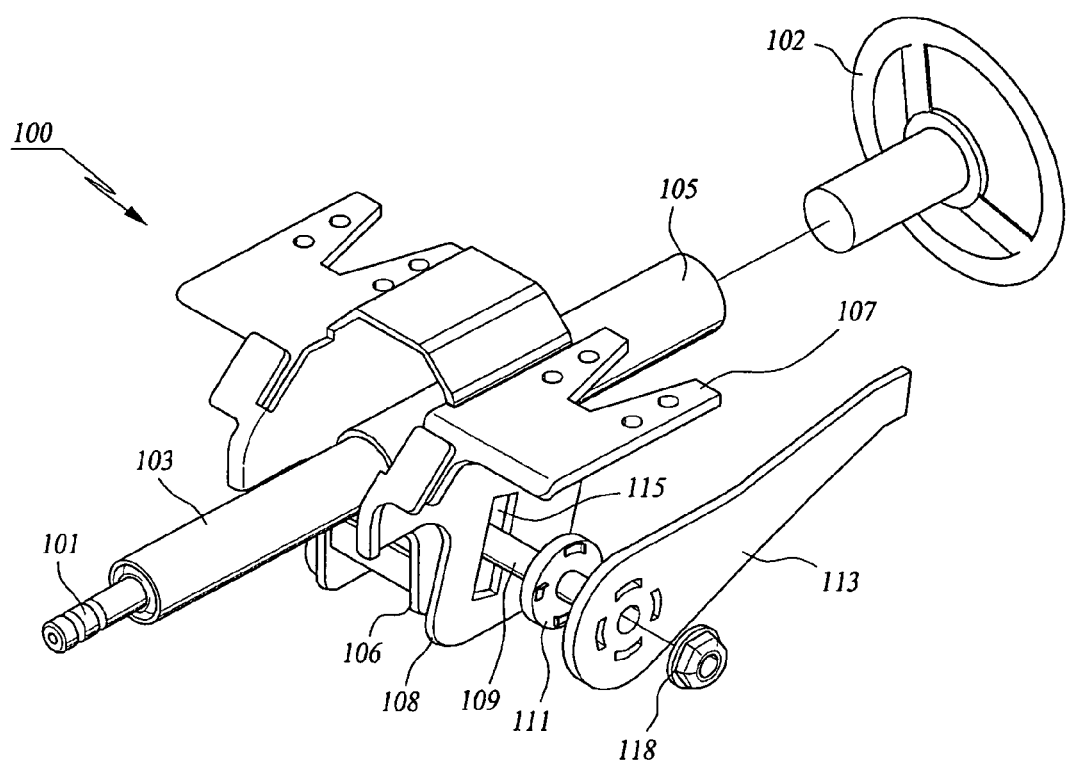
FIG. 1a is a partially exposed perspective view of a conventional telescoping-tilting device of a steering column for a vehicle.
Figure 1B:
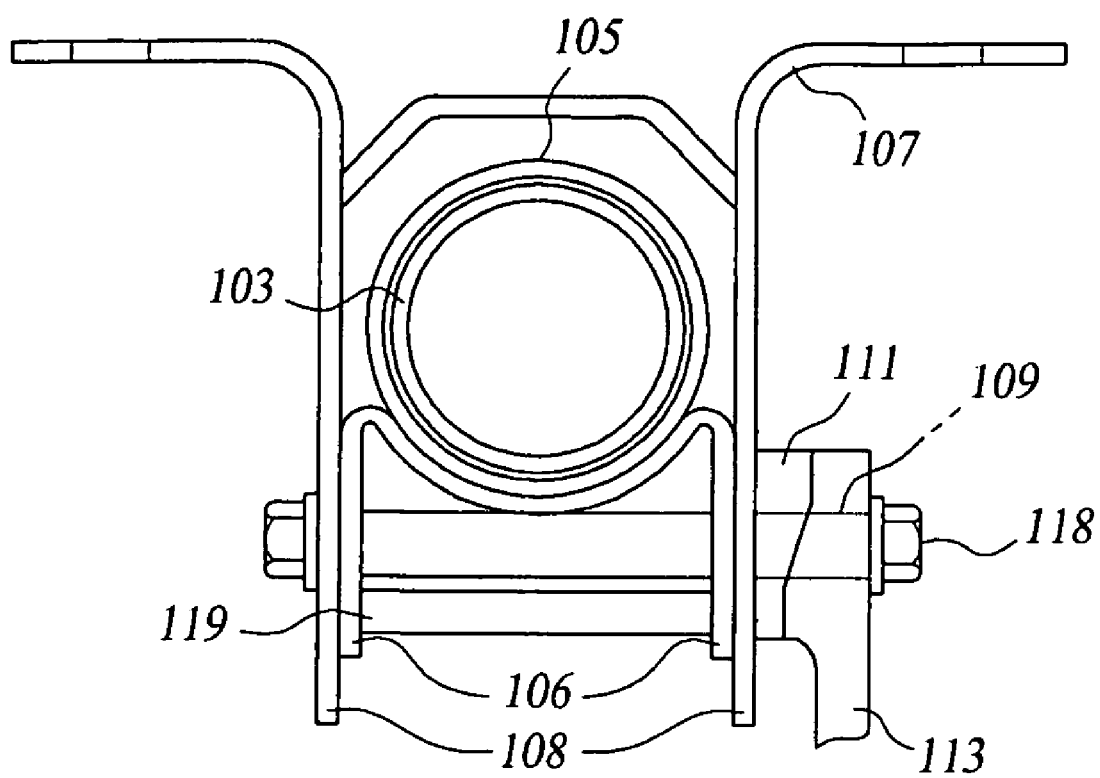
FIG. 1b is a sectional view of the telescoping-tilting device, which is assembled with a lever.

The telescoping-tilting device of a steering column for a vehicle according to an embodiment of the present invention, basically includes: a mounting bracket 107 for fixing a steering column to a chassis of a vehicle 107, the steering column including an inner tube 103 and an outer tube 105, which surround a steering shaft (See FIG. 1a) in such a manner that they can slide respective to each other; a distance member 106 positioned within the mounting bracket 107 in such a manner that the distance member 106 is attached onto a part of an outer circumferential surface of the outer tube 105; and a lever 113 assembled with one side of the mounting bracket 107 through a bolt 109 and a cam (See FIGS. 1a and 1b).

The steering shaft has an upper end connected to the steering wheel (See FIG. 1a) and transfers rotational force generated according to the operation of the steering wheel performed by the driver to wheels of the vehicle, which are positioned at a lower end of the steering shaft.

The inner tube 103 has a cylindrical shape having a uniform diameter and surrounds the lower part of the steering shaft. A lower bracket (not shown) is disposed at an outer circumferential surface of a lower part of the inner tube 103. The position of the inner tube 103 can be fixed by fixing the lower bracket in the chassis of the vehicle.

The outer tube 105 has an inner diameter larger than an outer diameter of the inner tube 103 so that the outer tube 105 can slide along an outer circumferential surface of the inner tube 103. That is, a telescoping operation can be performed. Meanwhile, the outer tube 105 surrounds an upper part of the steering shaft.

A distance member 106 is attached onto a part of the outer circumferential surface of the outer tube 105 by means of welding, etc. In the telescoping-tilting device of a steering column for a vehicle according to an embodiment of the present invention, each elongated hole 116 for adjusting a telescoping operation is formed at both sides of the distance member 106 in parallel to the steering shaft. Also, each guide groove 117 having a length equal to the elongated hole 116 is formed at inner surfaces of both sides of the distance member in parallel to the elongated hole. Alternatively, the distance member 106 may be integrally molded with the outer tube 105 to extend out from a part of an outer circumferential surface of the outer tube 105.

Also, a supporting block 120, which increases strength and intercepts the movement of the distance member 106 respective to the mounting bracket 107 when external impact is delivered to the steering column, is installed at the distance member 106. The supporting block 120 includes a through hole 121 (See FIG. 3) shaped to be engaged with the bolt and a wing 122 which extends out from both side surfaces of the supporting block 120 in each side direction and can be inserted into each guide groove 117 of the distance member 106.

The mounting bracket 107 is formed in such a manner that it surrounds the outer tube 105. The upper side of the mounting bracket 107 is fixed in the chassis of the vehicle and a supporting part 108, which is assembled with outer surfaces of both sides of the distance member 106, extends from the lower side of the mounting bracket 107. Also, an elongated hole 115 for adjusting a tilting operation is formed at the supporting part 108 in a direction perpendicular to the steering shaft so that a tilting operation of the steering column can be performed.

The lever 113 is assembled with a bolt 109 extending though the elongated hole 115 of the mounting bracket 107, the elongated hole 116 of the distance member 106 and the through hole 121 of the supporting block 120, and the bolt 109 is assembled with a nut (See FIGS. 1a and 1b). As the lever 113 rotates around an axis of the bolt 109, a cam disposed between the lever 113 and the supporting part 108 is driven so that each surface of the supporting part 108 of the mounting bracket 107 and each surface of the distance member 106, which face each other, make close contact with each other or are spaced from each other so as to set a locked state of the telescoping-tilting device 100 or a released state thereof.

Figure 3:
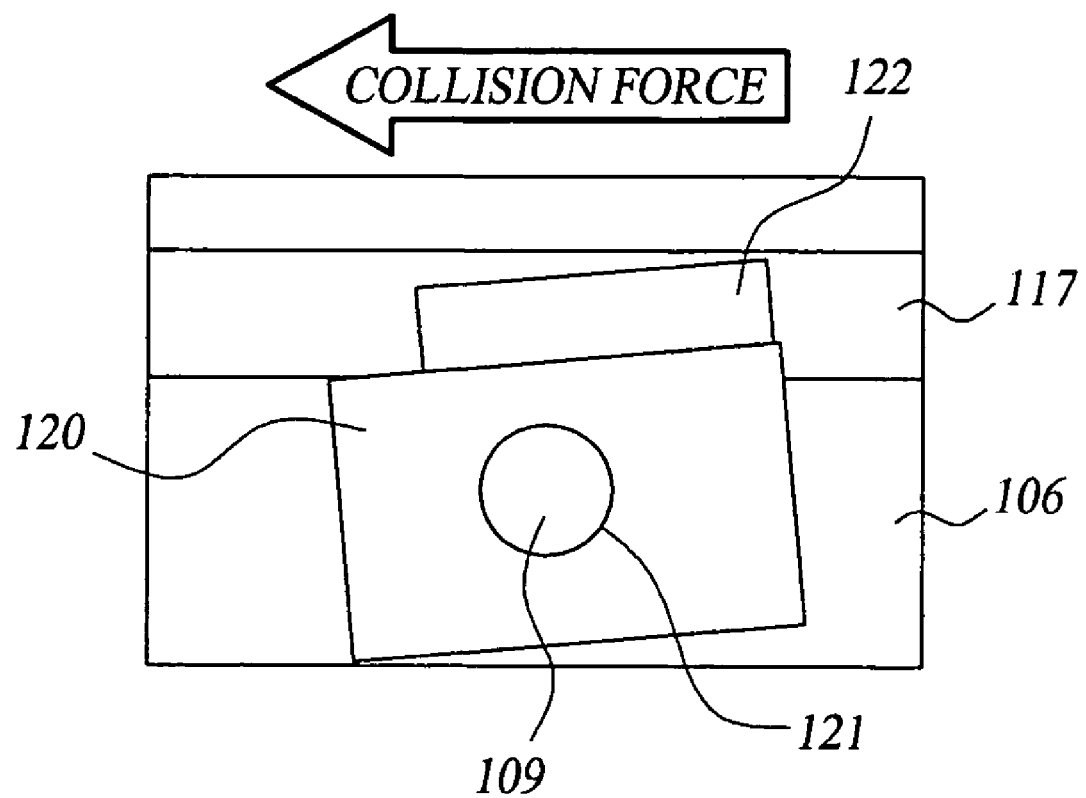
FIG. 3 is a schematic diagram showing the operation of a supporting block, which is a main part in the present invention.

FIG. 3 is a schematic block diagram showing the operation of the support block, which is a main part of the present invention.

If external impact is transferred to the steering column due to collision of a vehicle, etc., the distance member 106 together with the steering column moves toward the steering wheel. The distance member 106 pushes the supporting block 120, which makes close contact with the distance member 106 through tightening force generated by the bolt 109, the nut and the cam, toward the steering wheel.

At this time, the bolt 109, which has extended through the mounting bracket 107 fixed in the chassis and becomes a state where the bolt 109 cannot move in a direction parallel to the steering shaft due to the elongate hole 115 of the supporting part 108, intercepts the supporting block 120. Therefore, the supporting block 120 receives rotational moment in a state where the supporting block 120 is positioned within the distance member 106 in close contact therewith so that the supporting block 120 turns around based on the bolt 109 as a rotational center.

As such, while the supporting block 120 turns around, the wing 122 extending from the both sides of the supporting block 120 is slanted within the guide groove 117 of the distance member 106. Accordingly, the wing 122 makes a large amount of frictional force respective to each guide groove 117 so that the distance member 106 cannot move in an axial direction of the steering shaft respective to the mounting bracket 107.

Therefore, when impact is applied, the distance member 106 does not move respective to the mounting bracket 107. Therefore, there is an advantage in that collision energy is generated as planned, and a desired impact absorption mechanism can be achieved.

Although a specific embodiment of the present invention have been described for illustrative purposes, those skilled in the art will appreciate that various modifications, additions and substitutions are possible, without departing from the scope and spirit of the invention as disclosed in the accompanying claims.

The invention claimed is:

1. A telescoping-tilting device of a steering column for a vehicle, comprising:
   a mounting bracket for fixing a steering column including an inner tube and an outer tube surrounding a steering shaft in such a manner that the inner and outer tubes can slide respective to each other;
   a distance member positioned within the mounting bracket in such a manner that the distance member is attached onto a part of an outer circumferential surface of the outer tube, the distance member having elongated holes formed respectively both sides of the distance member in parallel to the steering shaft and guide grooves formed respectively inner surfaces of both sides of the distance member in parallel to each elongated hole;
   a lever assembled with one side of the mounting bracket through a bolt and a cam; and
   a supporting block positioned within the distance member, the supporting block having a through hole shaped to be engaged with the bolt and a wing inserted into each guide groove and which extends out from both sides of the supporting block in each side direction.

2. A telescoping-tilting device of a steering column for a vehicle, comprising:
   a mounting bracket for fixing a steering column including an inner tube and an outer tube surrounding a steering shaft in such a manner that the inner and outer tubes can slide respective to each other;
   a distance member positioned within the mounting bracket in such a manner that the distance member is integrally molded with the outer tube to extend out from a part of an outer circumferential surface of the outer tube, the distance member having elongated holes formed respectively both sides of the distance member in parallel to the steering shaft and guide grooves formed respectively inner surfaces of both sides of the distance member in parallel to each elongated hole;
   a lever assembled with one side of the mounting bracket through a bolt and a cam; and
   a supporting block positioned within the distance member, the supporting block having a through hole shaped to be engaged with the bolt and a wing inserted into each guide groove and which extends out from both sides of the supporting block in each side direction.

* * * * *